(12) United States Patent
Zhang et al.

(10) Patent No.: US 9,933,336 B2
(45) Date of Patent: Apr. 3, 2018

(54) GAS TURBINE HAVING FUEL MONITORING

(71) Applicant: ALSTOM Technology Ltd, Baden (CH)

(72) Inventors: Mengbin Zhang, Otelfingen (CH); Klaus-Dieter Liedtke, Endingen (CH); Wenceslao Granados Gomez, Moseley, WA (US)

(73) Assignee: ANSALDO ENERGIA IP UK LIMITED, London (GB)

( * ) Notice: Subject to any disclaimer, the term of this patent is extended or adjusted under 35 U.S.C. 154(b) by 505 days.

(21) Appl. No.: 14/488,686

(22) Filed: Sep. 17, 2014

(65) Prior Publication Data

US 2015/0000300 A1    Jan. 1, 2015

Related U.S. Application Data

(63) Continuation of application No. PCT/EP2013/055707, filed on Mar. 19, 2013.

(30) Foreign Application Priority Data

Mar. 20, 2012    (EP) .................................. 12160259

(51) Int. Cl.
*F02C 9/46* (2006.01)
*G01M 15/14* (2006.01)
(Continued)

(52) U.S. Cl.
CPC ............. *G01M 15/14* (2013.01); *F01D 21/14* (2013.01); *F02C 7/25* (2013.01); *F02C 9/26* (2013.01); *F02C 9/28* (2013.01); *F02C 9/285* (2013.01); *F02C 9/32* (2013.01); *F02C 9/42* (2013.01); *F02C 9/46* (2013.01); *F23N 1/00* (2013.01); *F23N 5/24* (2013.01); *F23N 5/242* (2013.01); *F23N 5/245* (2013.01); *F23N 5/247* (2013.01); *F02C 7/22* (2013.01); *F02C 7/222* (2013.01);
(Continued)

(58) Field of Classification Search
CPC .. F02C 9/46; F05B 2270/107; F05D 2270/09; F23N 2031/18
See application file for complete search history.

(56) References Cited

U.S. PATENT DOCUMENTS 6,761,629 B1    7/2004  Parker et al.
2011/0282501 A1   11/2011  Martin
(Continued)

FOREIGN PATENT DOCUMENTS

EP        0 718 470 A2    6/1996

*Primary Examiner* — Gerald L Sung
*Assistant Examiner* — Scott Walthour
(74) *Attorney, Agent, or Firm* — Buchanan Ingersoll & Rooney PC

(57) ABSTRACT

The invention relates to a method for detecting a fuel leakage in the fuel distribution system between a fuel control valve and at least one burner of a gas turbine during the operation of the gas turbine. In order to detect a fuel leakage, the fuel consumption is approximated in accordance with the mechanical power of the gas turbine, the fuel amount fed to the fuel distribution system is determined, and the leakage flow is determined from the difference between the fed fuel amount and the fuel consumption. The invention further relates to a gas turbine for performing such a method.

14 Claims, 2 Drawing Sheets

(51) Int. Cl.
*F02C 9/42* (2006.01)
*F23N 5/24* (2006.01)
*F02C 9/28* (2006.01)
*F02C 7/25* (2006.01)
*F02C 9/26* (2006.01)
*F23N 1/00* (2006.01)
*F01D 21/14* (2006.01)
*F02C 9/32* (2006.01)
*F02C 7/22* (2006.01)
*F02C 7/228* (2006.01)

(52) U.S. Cl.
CPC ........... *F02C 7/228* (2013.01); *F05B 2260/80* (2013.01); *F05B 2270/309* (2013.01); *F05B 2270/335* (2013.01); *F05B 2270/337* (2013.01); *F05D 2260/80* (2013.01); *F05D 2270/309* (2013.01); *F05D 2270/335* (2013.01); *F23N 2041/20* (2013.01)

(56) References Cited

U.S. PATENT DOCUMENTS

2013/0006432 A1* 1/2013 Noda .................... G06Q 50/06
  700/291
2013/0269364 A1* 10/2013 Romig ................... F02C 7/232
  60/779

* cited by examiner

GAS TURBINE HAVING FUEL MONITORING

CROSS-REFERENCE TO RELATED APPLICATIONS

This application claims priority to PCT/EP2013/055707 filed Mar. 19, 2013, which claims priority to European application 12160259.3 filed Mar. 20, 2012, both of which are hereby incorporated in their entireties.

TECHNICAL FIELD

The present invention relates to the field of power plant technology. It refers to a method for detecting fuel leakages in a gas turbine plant and also to a gas turbine plant for implementing such a method.

BACKGROUND

Despite all precautionary measures in the design, the construction and operation of gas turbines, fuel leakages of liquid or gaseous fuel in gas turbines guarantee a great risk. If they are not detected in good time, then larger quantities of fuel can escape in an uncontrolled manner, can ignite, and combust or explode with catastrophic consequences.

In order to detect fuel leakages, oil-detecting cables, oil-detector matrices and gas sensors or gas sniffers are known. Extensive monitoring of a ramified fuel distribution system between the fuel control valve and the fuel input line into the individual burners of a gas turbine is particularly difficult. Using conventional methods, this is very costly and, depending on the discharge direction of the leakage flow, a leakage can only be detected with a delay.

Instead of gas detection in the direct vicinity of the gas lines, it was proposed in U.S. Pat. No. 6,761,629 to measure the gas concentration at the outlet of a ventilated enclosure for a gas turbine. In this case, depending on the flow rate of the ventilating air, a threshold value for the concentration of a leakage gas is determined and an alarm is generated when the threshold value is exceeded. In this method also, a leakage can only be detected with a delay.

SUMMARY

It is an aim of the present disclosure to specify a method for the fast, reliable detection of fuel leakages in the fuel distribution system between a fuel control valve and at least one burner of a gas turbine. Furthermore, a gas turbine power plant, which is suitable for implementing the method, is a subject of the disclosure.

The disclosed method for detecting a fuel leakage during the operation of the gas turbine in the fuel distribution system between the fuel control valve and the at least one burner of the gas turbine is distinguished by the fuel consumption being approximated as a function of the power output of the gas turbine, by the amount of fuel fed to the fuel distribution system being defined, and by the leakage flow being determined from the difference between the amount of fuel fed to the fuel distribution system and the fuel consumption.

According to one embodiment of the method, the fuel consumption is established as a function of gas turbine power output, of the efficiency of the gas turbine and of the heating value of the fuel.

According to a further embodiment of the method, the fuel consumption of the gas turbine is calculated by the sum of a fuel mass flow in idling mode and a fuel mass flow in power output mode, wherein the fuel mass flow in the power output mode is established as a function of gas turbine power output, output efficiency of the gas turbine and the heating value of the fuel. In this case, the fuel mass flow in idling mode is the fuel mass flow which the gas turbine consumes when idling.

Furthermore, the power output of the gas turbine during load operation can be approximated by means of the generator power output. In this way, during load operation the fuel mass flow in power output mode can be established as a function of the generator power output.

According to a further embodiment of the method, for transient operation, in which the rotational speed of the gas turbine varies, the acceleration of the shaft train of the gas turbine is measured and the power output of the turbine is established from the sum of generator power output and the power for accelerating the shaft train. A rotational speed change of the shaft train of the gas turbine takes place for example during start-up of the gas turbine and also in the event of changes of the network frequency. During start-up, the generator power output is typically zero or negative, i.e. the generator is not yet synchronized and no electric power is delivered or the generator is operated as a motor for starting the gas turbine.

Both the calculation of the fuel consumption of the gas turbine and the measurement or calculation of the amount of fuel supplied are typically an approximation of the actual fuel flows. The measurement of the amount of fuel supplied is negatively affected by measurement errors and the calculation of the fuel consumption via a level of efficiency, for example, is inaccurate and cannot take into consideration all the operating parameters and, for example, aging influences, with any accuracy. In order to avoid a false leakage indication, according to one embodiment the time increment is established from the calculated leakage flow and a leakage indication is displayed as a function of the increment. In this embodiment, the time increment of the leakage is calculated and a leakage is only judged as being detected when the calculated increment exceeds a threshold value. Suddenly occurring leakages can be reliably detected with this embodiment. Creeping, small leakages have to be detected in a conventional way, e.g. via sensors or gas concentration measurements.

According to one embodiment of the method, the time increment of the leakage is calculated according to the equation:

$$m_{leak\_inc} = m_{leak}\left(1 - \frac{1}{\tau}\int e^{-\frac{t}{\tau}} dt\right) = m_{leak} e^{-\frac{t}{\tau}}, \tag{1}$$

wherein the increment is calculated over the time t with an integration period $\tau$.

In order to compensate for errors in measurement and approximation, according to an alternative embodiment of the method a leakage is only judged as being detected when the calculated leakage flow exceeds a threshold value.

The amount of fuel supplied can be measured by means of a measuring instrument. According to an advantageous embodiment of the method, the amount of fuel supplied is calculated as a function of the position of the fuel control valve, of the fuel control valve characteristic and also of the fuel pressure at the control valve. For gaseous fuels, the fuel temperature is also measured and taken into consideration in the calculation.

Instead of the measured amount of fuel supplied, according to a further embodiment of the method a set point amount of fuel (also referred to as commanded mass flow) of the governor—by means of which the fuel control valve is controlled—can be used as the amount of fuel supplied.

In order to ensure a reliable operation of the gas turbine during a rapid change of the operating conditions, according to one embodiment the detection of the fuel leakage is deactivated during a rapid change of the operating conditions of the gas turbine. As a result, the effect of increased measurement errors leading to a false alarm on account of the transient processes is prevented. Alternatively, the threshold of the increment or of the leakage flow for detecting a fuel leakage can also be increased during a rapid change of the operating conditions.

In particular, according to one embodiment of the method the threshold of the increment or of the leakage flow for detecting a fuel leakage is increased during a load shedding or the detection is deactivated.

According to a further embodiment of the method, the threshold of the increment or of the leakage flow for detecting a fuel leakage is deactivated during an operating mode for frequency support.

In order to protect the gas turbine against the possible consequences of a fuel leakage, according to one embodiment of the method a trip valve in the fuel feed line is closed as soon as a fuel leakage is detected.

The method can be implemented both for operation with a gaseous fuel and for operation with a liquid fuel. According to one embodiment, the method is used during oil operation.

In addition to the method, a power plant for implementing the method is a subject of the disclosure. Such a power plant comprises a gas turbine, a governor, a fuel distribution system, which is arranged between a fuel control valve and at least one burner, and a generator which is driven by the gas turbine. In order to be able to implement the method for detecting a fuel leakage, the governor is configured so that it can approximate the fuel consumption as a function of the power output of the gas turbine, which can define the amount of fuel supplied, and can determine the leakage flow from the difference between the amount of fuel supplied and the fuel consumption or the set point amount of fuel and the fuel consumption.

BRIEF DESCRIPTION OF THE DRAWINGS

The invention is to be explained below in more detail for exemplary embodiments with reference to the drawing. In the drawing

DETAILED DESCRIPTION

Figure 1:
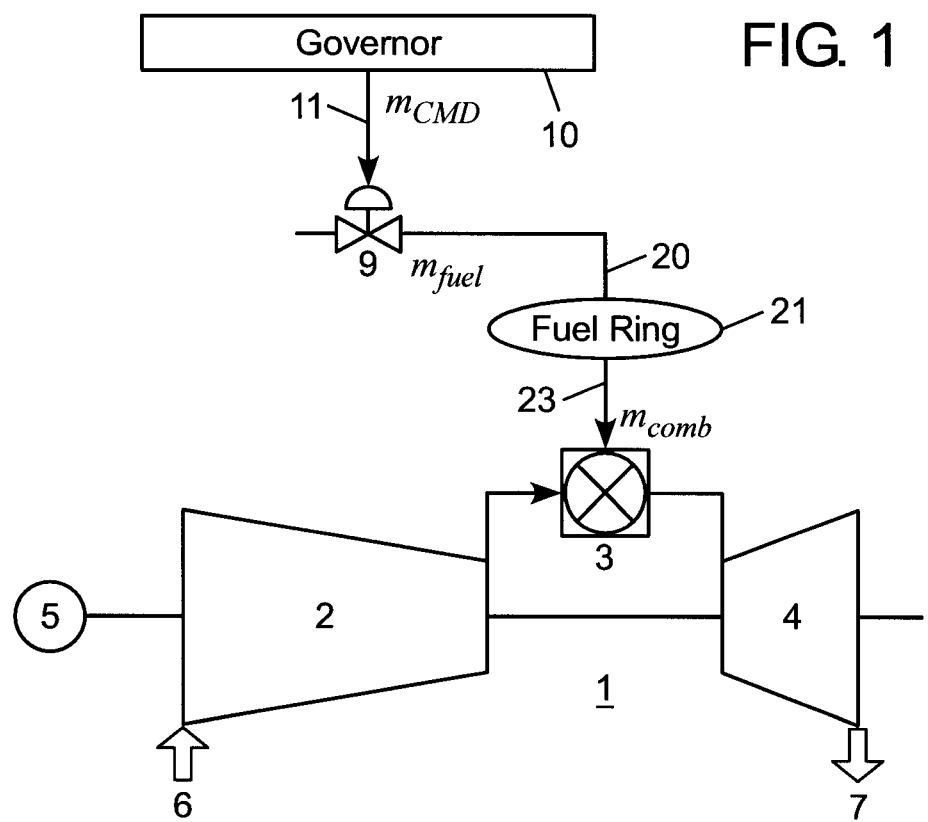
FIG. 1 shows a greatly simplified schematic diagram of a power plant with a gas turbine, a governor and a fuel distribution system.

FIG. 1 shows in a schematic representation the essential elements of a gas turbine power plant according to the invention. The gas turbine 1 comprises a compressor 2 in which intake air 6 is compressed to form combustion air.

This is fed to a combustion chamber 3 and combusted there with the supplied fuel $m_{comb}$. The hot combustion gases are then expanded in a turbine 4. The useful energy which is generated in the turbine 4 is then converted into electric energy, for example, by means of a first generator 5 which is arranged on the same shaft.

The hot exhaust gases 7 which issue from the turbine 4, for optimum utilization of the energy still contained therein, are typically used in a heat recovery steam generator (HRSG) for generating steam for a water-steam cycle (not shown).

The operation of the gas turbine 1 is controlled by a governor 10. In particular, the amount of fuel $m_{fuel}$ supplied is controlled by means of a control valve 9, to which is transmitted a set point amount of fuel $m_{CMD}$ (command) via a signal line 11. The fuel is fed to the combustion chamber 3 via a fuel distribution system which in the depicted example comprises a fuel line 20, a fuel ring main 21 and individual lines 23 to the burners. The sum of the amount of fuel which is introduced through the individual lines 23 into the combustion chamber 3 is equal to the fuel consumption $m_{comb}$ of the gas turbine. During steady-state, leakage-free operation, the fuel consumption $m_{comb}$ is equal to the amount of fuel $m_{fuel}$ which is supplied by means of the control valve 9. Additional measurement lines and additional signal lines to the governor 10, such as for the transmission of the actual position of the fuel control valve 9, are not shown.

Figure 2:
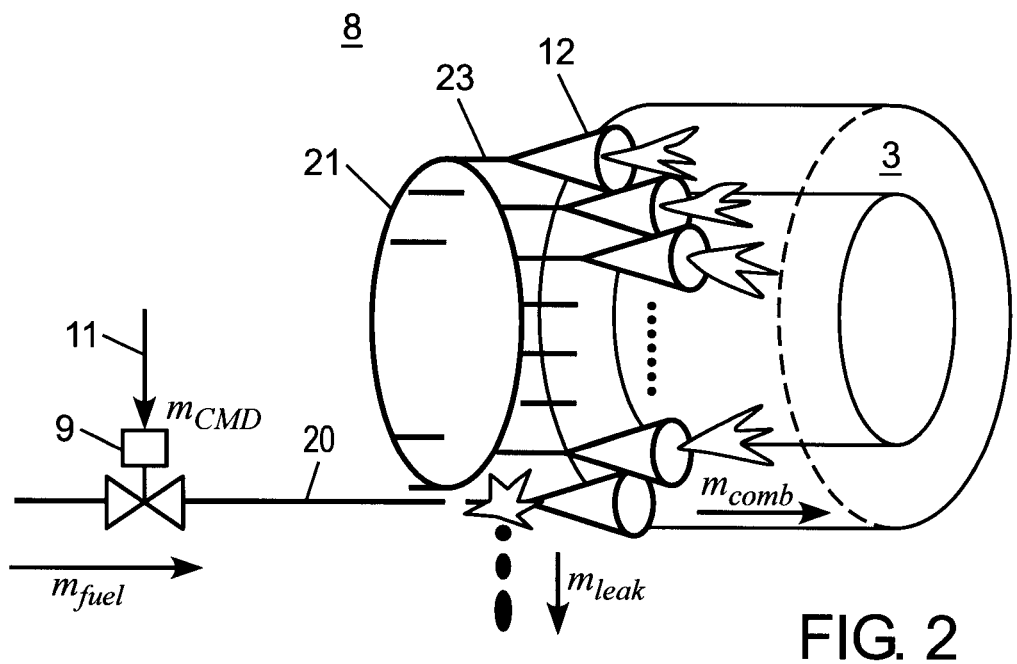
FIG. 2 shows a greatly simplified detail from the fuel distribution system between the fuel control valve and the burners of a gas turbine.

FIG. 2 shows a greatly simplified detail from the fuel distribution system between the fuel control valve 9 and the burners 12 of a gas turbine 1. The burners 12 open into the combustion chamber 3 which in the example is shown as an annular combustion chamber. The burners 12 are supplied with fuel by the fuel control valve 9 via a fuel distribution system, comprising a fuel line 20, a fuel ring main 21 and individual lines 23. In the process, some of the amount of fuel supplied $m_{fuel}$ is lost as fuel leakage $m_{leak}$ so that the actual fuel consumption $m_{comb}$ of the combustion chamber 3 is less than the amount of fuel supplied $m_{fuel}$.

Figure 3:
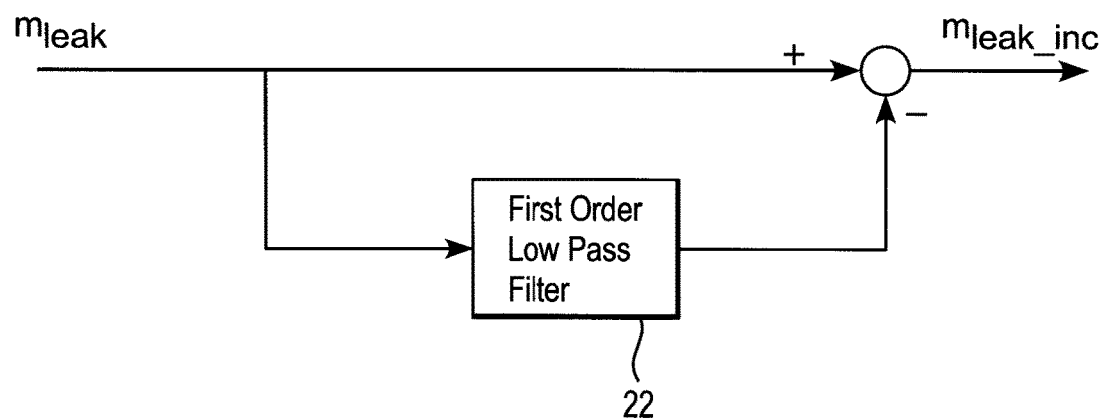
FIG. 3 shows a flow diagram of the increment calculation.

FIG. 3 shows an exemplary flow diagram of the increment calculation, wherein the increment of the fuel leakage $m_{leak\_inc}$ is established from the difference of the determined fuel leakage $m_{leak}$ and the value of a first-order low-pass filter 22 of the fuel leakage.

The fuel consumption $m_{comb}$ of the gas turbine 1 is the quotient of heat input Q as a result of combustion and the lower heating value (LHV) of the fuel:

$$m_{comb} = Q/LHV \tag{2},$$

wherein the heat input Q is equal to the quotient of the entire generated power output and efficiency $\eta$ of the gas turbine. With the generated power output as the sum of generator power output $P_{geno}$ (the generator efficiency is set as being equal to one for simplification) and acceleration power of the gas turbine, the following results:

$$Q = (P_{geno} + J\omega\dot{\omega})/\eta \tag{3},$$

wherein the acceleration power of the gas turbine is the product of the inertia moment J, the angular speed $\omega$ and the angular acceleration $\dot{\omega}$.

For steady-state operation, the angular acceleration is equal to zero and therefore the following applies:

$$Q = P_{geno}/\eta \tag{4},$$

wherein the efficiency $\eta$ for different operating states is known and can be determined as a function of the most important operating parameters, such as load, compressor inlet temperature, position of the compressor guide vanes, inlet pressure, etc., or can be stored in tables.

In practice, it has been shown that the heat input Q can be split into a heat input for idling mode $Q_{idle}$ plus a heat input for power generation mode $Q_{load}$:

$$Q = Q_{idle} + Q_{load} \quad (5)$$

wherein the heat input for load $Q_{load}$ is determined from the generator power output and a load efficiency $\eta_{load}$:

$$Q_{load} = P_{geno}/\eta_{load} \quad (6).$$

Since the heat which is released during the complete combustion is the product of the lower heating value and the fuel mass flow, the following results from 5 and 6:

$$m_{comb} = P_{geno}/(\eta_{load}*LHV) + m_{idle} \quad (7),$$

wherein $m_{idle}$ is the fuel mass flow which is required for releasing the heat input during idling mode $Q_{idle}$. The division into idling and power proportions allows the fuel mass flow $m_{comb}$ to be approximated with the aid of a constant mass flow in idling mode $m_{idle}$ and a constant power output efficiency $\eta_{load}$.

The fuel leakage $m_{leak}$ in the fuel distribution system is equal to the difference of the supplied fuel mass flow and the exhausted fuel mass flow, i.e. of the amount of fuel supplied $m_{fuel}$ and the fuel consumption $m_{comb}$ in the combustion chamber 3:

$$m_{leak} = m_{fuel} - m_{comb} \quad (8).$$

With the equations 7, 8 and an approximation of the amount of fuel supplied $m_{fuel}$ by means of the set point fuel mass flow $m_{cmd}$, the simple equation for the leakage flow $m_{leak}$ results:

$$m_{leak} = m_{cmd} - \left(\frac{P_{geno}}{\eta_{load} LHV} + m_{idle}\right). \quad (9)$$

Since all the values during steady-state operation of a gas turbine which are required for calculating the leakage flow $m_{leak}$ according to equation 9 are known, the leakage flow $m_{leak}$ can therefore be calculated in a governor 10.

The possible embodiments of the invention are not limited to the examples which are represented here. Based on the examples, a large number of possibilities, equivalent circuits and methods open themselves up to the person skilled in the art for implementation.

Also to be taken into consideration during operation with gas as fuel is the volume of the fuel distribution system. The fuel distribution system can act as a fuel gas accumulator and lead to a considerable delay. A pressure build-up or pressure decay in the system is to be taken into consideration for an accurate leakage calculation. By the change of pressure of the fuel gas in the fuel distribution system, the volume of the fuel distribution system and the temperature of the fuel gas in the fuel distribution system, the difference can be calculated from the fuel consumption $m_{comb}$ in the combustion chamber 3 and the amount of fuel $m_{fuel}$ supplied to the fuel distribution system, which is to be attributed to the accumulating effect of the fuel distribution system. An effective leakage flow is the difference—reduced by the accumulating effect—of the fuel consumption $m_{comb}$ in the combustion chamber 3 and the amount of fuel supplied $m_{fuel}$.

Furthermore, the use is not limited to gas turbines with a single combustion chamber, as is shown in FIG. 1, but can also be used without limitation for gas turbines with sequential combustion, as are known from EP0718470, for example.

The invention claimed is:

1. A method for detecting a fuel leakage during operation of a gas turbine, the gas turbine being controlled by a governor configured to compute an amount of a leakage flow of fuel in a fuel distribution system between a fuel control valve and at least one burner of the gas turbine, the method comprising:
   in the governor:
      approximating a fuel consumption of the gas turbine as a function of a mechanical power output of the gas turbine;
      defining an amount of fuel supplied to the fuel distribution system;
      computing the amount of the leakage flow from a difference between the defined amount of fuel supplied and the approximated fuel consumption; and
   closing a trip valve in a fuel feed line of the fuel distribution system via a signal generated based on the computed amount of the leakage flow.

2. The method for detecting a fuel leakage as claimed in claim 1, wherein approximating the fuel consumption of the gas turbine as a function of the mechanical power output of the gas turbine further comprises accounting for both an efficiency of the gas turbine and a heating value of the fuel.

3. The method for detecting a fuel leakage as claimed in claim 1, wherein approximating the fuel consumption of the gas turbine as a function of the mechanical power output of the gas turbine comprises calculating a sum of a fuel mass flow in idling mode and a fuel mass flow in power output mode, wherein the fuel mass flow in power output mode is determined based on mechanical power output of the gas turbine, power output efficiency of the gas turbine, and a heating value of the fuel.

4. The method for detecting a fuel leakage as claimed in claim 1, comprising:
   approximating the mechanical power output of the gas turbine during steady-state load operation via a generator power output.

5. The method for detecting a fuel leakage as claimed in claim 1, comprising:
   measuring, during start-up of the gas turbine and during changes of a network frequency, acceleration of a shaft train of the gas turbine; and
   approximating the mechanical power output of the gas turbine from a sum of generator power output and power for accelerating the shaft train.

6. The method for detecting a fuel leakage as claimed in claim 1,
   wherein computing the amount of the leakage flow from the difference between the defined amount of fuel supplied and the approximated fuel consumption comprises calculating a time increment of the leakage flow; and
   judging detection of fuel leakage when the calculated time increment exceeds a threshold value.

7. The method for detecting a fuel leakage as claimed in claim 6, wherein the time increment of the leakage flow is calculated according to the equation:

$$m_{leak\_inc} = m_{leak}\left(1 - \frac{1}{\tau}\int e^{-\frac{t}{\tau}} dt\right) = m_{leak} e^{-\frac{t}{\tau}},$$

wherein $\tau$ is an integration duration over time t of the time increment calculation.

8. The method for detecting a fuel leakage as claimed in claim 1, comprising:
   judging detection of fuel leakage when the computed amount of the leakage flow exceeds a threshold value.

9. The method for detecting a fuel leakage as claimed in claim 1, wherein defining the amount of fuel supplied involves calculating the amount of fuel supplied as a function of at least a position of a fuel control valve and fuel pressure at the fuel control valve.

10. The method for detecting a fuel leakage as claimed in claim 1, wherein defining the amount of fuel supplied involves setting a set point amount of fuel by the governor.

11. The method for detecting a fuel leakage as claimed in claim 1, comprising:
   deactivating detection of the fuel leakage when a change of operating conditions of the gas turbine occurs at a rate which exceeds a threshold.

12. The method for detecting a fuel leakage as claimed in claim 11, wherein the operating conditions include a load shedding or an operating mode for frequency support.

13. The method for detecting a fuel leakage as claimed in claim 11, wherein deactivating detection of the fuel leakage includes deactivating a threshold of the computed amount of the leakage flow, which occurs during operating conditions, wherein the operating conditions include a load shedding or an operating mode for frequency support.

14. A power plant comprising:
a gas turbine;
a governor configured to control the gas turbine;
a fuel distribution system between a fuel control valve and at least one burner of the gas turbine; and
a generator which is arranged to be driven by the gas turbine;
wherein the governor is further configured to:
   detect a fuel leakage during operation of the gas turbine by:
      (i) approximating a fuel consumption of the gas turbine as a function of a mechanical power output of the gas turbine,
      (ii) defining an amount of fuel supplied to the gas turbine, and
      (iii) computing an amount of a leakage flow of fuel in the fuel distribution system between the fuel control valve and the at least one burner from a difference between the defined amount of fuel supplied and the approximated fuel consumption; and
   close a trip valve in a fuel feed line of the fuel distribution system via a signal generated based on the computed amount of the leakage flow.

* * * * *